No. 638,181. Patented Nov. 28, 1899.
S. L. GOULD, Dec'd.
E. D. GOULD, Administratrix.
SPEED REDUCING MECHANISM.
(Application filed Mar. 15, 1899.)
(No Model.)
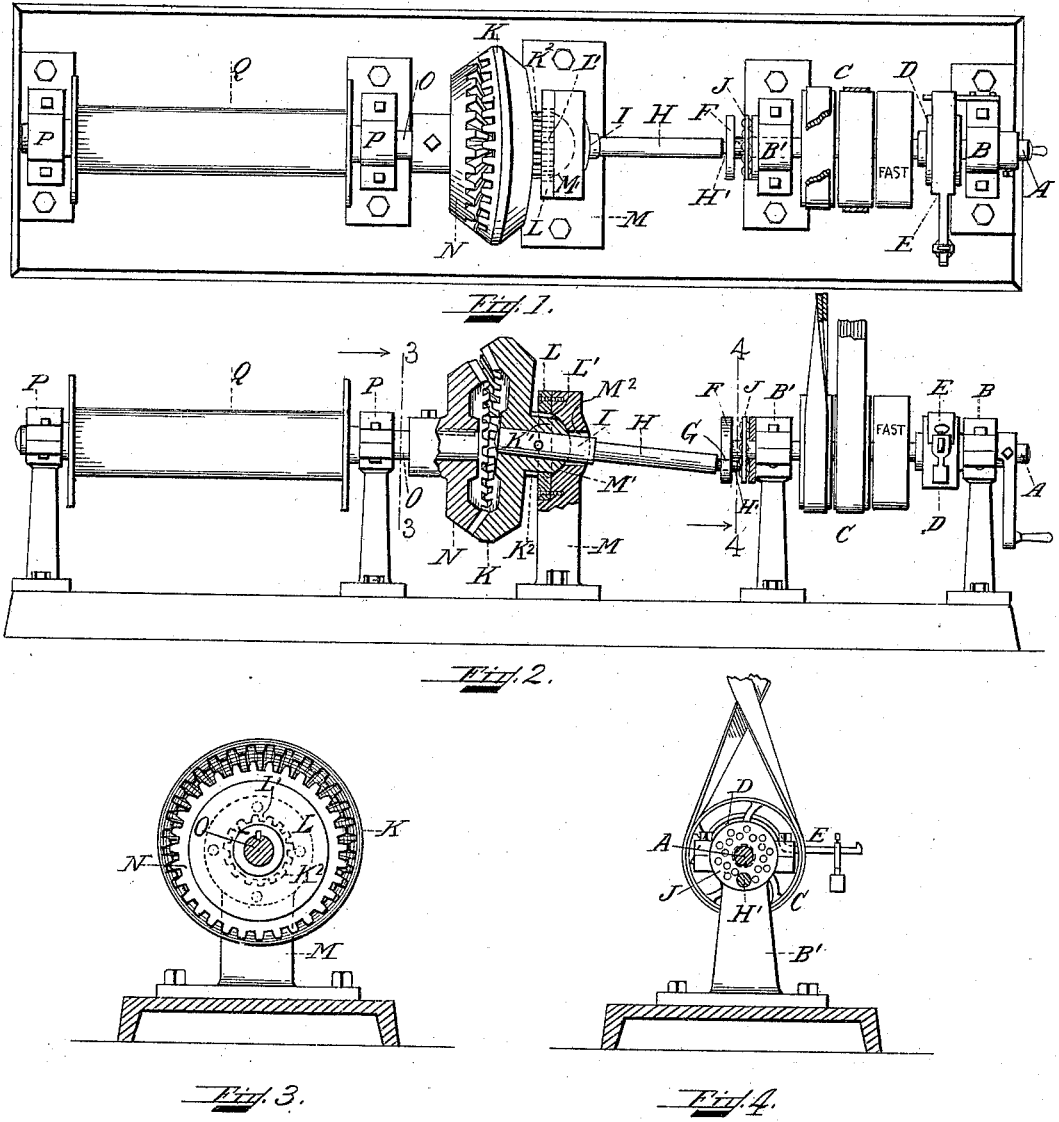

UNITED STATES PATENT OFFICE.

EMMA D. GOULD, OF GARDINER, MAINE, ADMINISTRATRIX OF SIMEON L. GOULD, DECEASED, ASSIGNOR, BY DIRECT AND MESNE ASSIGNMENTS, TO SANFORD K. WEYMOUTH, OF HYDE PARK, AND H. E. REMICK, OF BOSTON, MASSACHUSETTS.

SPEED-REDUCING MECHANISM.

SPECIFICATION forming part of Letters Patent No. 638,181, dated November 28, 1899.

Application filed March 15, 1899. Serial No. 709,131. (No model.)

*To all whom it may concern:*

Be it known that SIMEON L. GOULD, late a citizen of the United States of America and a resident of Gardiner, in the county of Kennebec and State of Maine, did invent certain new and useful Improvements in Speed-Reducing Mechanism, of which the following is a specification.

This invention relates to a new system of speed-reducing mechanism whereby a differential motion is produced through the novel arrangement or combination of a single pair of gears.

The object of this invention is to produce a uniform retarded velocity ratio in gearing axially arranged or in line-shafting, the improved invention being primarily applicable to the various classes of hoisting machinery operated manually or by power and particularly adapted to elevator-lifts and as a substitute for worm and gear and, in fact, all allied uses where economy, safety, durability, efficiency, and power are desirable factors.

A specific description of the features of this invention is hereinafter given, and particularly defined in the claims.

Referring to the annexed drawings, forming a part of this specification, wherein is illustrated a simple form of hoisting mechanism well adapted to exhibit the principle embodied in this invention, Figure 1 denotes a plan of the winch, rotation of the drum being effected by the novel arrangement of the gear and shaft eccentrically actuated either by power or manually. Fig. 2 is a side elevation of the same with the gears, the bearing of the shaft, and the ball-bearing eccentric in transverse vertical section. Fig. 3 exhibits a transverse vertical section of the apparatus on dotted line 3 3 of Fig. 2, showing the gears in elevation, Fig. 4 being a similar view on dotted line 4 4 of Fig. 2, illustrating the bearing of the eccentrically-actuated gear-shaft.

Corresponding characters denote similar features throughout the several views, referring to which—

A denotes the horizontal driving-shaft, rotating in suitable bearings B B' and provided with the ordinary accessories to revolve and control the same, comprising the set of pulleys C, the clutch D, and brake E. One end of said shaft A has secured to it the disk F, pierced at one side of its axis, as at G, Fig. 2, to loosely receive the adjacent end H' of the shaft H, which is non-revoluble in relation to its bearings I, but has imparted to it a gyratory motion through the rotation of said disk F, which practically acts as an eccentric, for which it is substituted.

Ball-bearings of any suitable construction may be employed to lessen the friction of such parts of the mechanism as may require it, as exampled at J, where it provides a comparatively frictionless contact with the longitudinally-slight thrust of the shaft H. Said shaft has keyed or otherwise secured upon it the gear-wheel K, which wabbles when rotating at an angle from the perpendicular governed by the circumference of the eccentric-disk F. The gear-wheel K may be preferably of the internal bevel illustrated, but not to the exclusion of other forms which would manifestly be adaptable to the desired results. The hub K' may also be of ordinary construction, though the semiglobular form depicted as insuring stability and efficiency in movement is preferred. Said hub is provided with one or a series of teeth $K^2$, in conjunction with the plate L, which is internally and correspondingly provided with teeth L', to engage the teeth on the hub K', and is preferably secured to the standard M, although it may be integral therewith. Said standard M is concaved, as at M', Fig. 2, to receive the toothed or splined hub K', and pierced, as at $M^2$, to loosely receive the shaft H. Said hub, plate, and standard thus coact to form collectively a rocking bearing, which, however, could be replaced with a universal joint, pivotal or ordinary splined bearing, or any common form thereof, so long as axial rotation of said shaft is prevented. The rotating gear-wheel N, of lesser dimensions for a purpose hereinafter disclosed, is keyed to the horizontal revoluble shaft O, properly journaled in bearings or journal-boxes P P, which revolve the drum Q, as it receives rotary motion through the non-rotating gear-wheel K in the following manner: The position of the gear K being always at sufficient angle of traction to the gear N to engage with several of the teeth of the latter and the axis of shaft H being variable in its vibratory movement to the axis of the rotating horizontal shaft O the gyration of the shaft H by its actuating-eccentric F compels the gear K to rock, or, more properly, to wabble in a circuitous path, thus engaging consecutively with the teeth of the lesser gear N, compelling the latter to revolve with a motion as uniform as if geared to run in the ordinary manner.

To accomplish the reduction of speed, the non-rotative gear-wheel K is constructed with an increased number of teeth—as, for example, twenty-six to twenty-four in the rotating gear-wheel N. Thus the shaft H gyrates twelve periods to one revolution of the rotating gear N and obviously slows the speed of the revoluble shaft O in the same ratio; or, as a further example, the proportion of the teeth in their respective gear-wheels may be as thirty-eight to thirty-six. Therefore eighteen revolutions of the driving or power shaft A is transmitted by the gyrating shaft H and gears K N to the revoluble shaft O, which slows to one revolution.

While it is preferred to illustrate and describe the improved invention in connection with a form of hoisting apparatus, it is not desired to curtail its advantageous employment in all mechanisms to which it is adapted; neither is it wished to be confined to a strict interpretation of the details of construction herein set forth, as it is obvious that the dimensions of the gear-wheels, the number and proportion of their teeth, or the length of the gyrating shaft and its bearing are factors that may be varied for substantially such equivalents as would come within the fair scope and spirit of the invention, which, having been described, it is desired to secure by Letters Patent of the United States; and

What is claimed is—

1. In a speed-reducing mechanism, the non-rotative gear-wheel having a gyratory motion, the gear-wheel having a rotatory motion, the former adapted to directly actuate the latter at a reduced speed, the means to impart said gyratory motion, the standard provided with a fixed plate having an internal gear, and the gear forming an integral part of the hub of the non-rotating gear-wheel, arranged and adapted to form a bearing to permit oscillation, and prevent axial rotation of said non-rotating gear for the purpose specified.

2. The semiglobular hub of the gear-wheel K, provided with two or more teeth, the standard having a semiglobular concavity corresponding to, and adapted to receive the aforesaid hub and means secured thereto to prevent rotation of said gear-wheel, the non-revoluble shaft having a gyratory motion, the rotating shaft and its gear, and the drum adapted to rotate at a reduced speed from said non-revoluble shaft as specified.

3. The non-revoluble gear-wheel having a variable angle of traction without rotation, the shaft having a gyratory motion adapted to oscillate said gear-wheel thereto secured and means to impart a gyratory motion to said shaft, in combination therewith the revoluble shaft provided with a disk at one end to support the adjacent end of the non-revoluble shaft, and means to impart motion to and control the said revoluble shaft for the purpose specified.

4. In combination with a new train of speed-reducing mechanism, the drum provided with a revoluble shaft and gear-wheel thereto secured, the non-revoluble gear-wheel having a variable angle of traction adapted to engage with and transmit motion to the revoluble gear and shaft, the semiglobular hub forming an integral part of said non-revoluble gear, and coacting means attached to the standard M to obviate axial rotation thereof, the shaft having a gyratory motion means to reduce the friction of the gyrating shaft, the shaft A and means thereto attached to impart motion as specified.

Signed at Gardiner, Maine, this 2d day of March, 1899.

EMMA D. GOULD,
*Administratrix of Simeon L. Gould, deceased.*

Witnesses:
W. E. MAXEY,
KATIE E. FARRINGTON.